United States Patent
Park et al.

(10) Patent No.: US 7,901,813 B2
(45) Date of Patent: Mar. 8, 2011

(54) NON-AQUEOUS ELECTROLYTE ADDITIVE FOR IMPROVING SAFETY AND LITHIUM ION SECONDARY BATTERY COMPRISING THE SAME

(75) Inventors: Hong-Kyu Park, Taejeon (KR); Jeh-Won Choi, Seoul (KR); Yeon-Hee Lee, Jeollanam-do (KR); Young-Tack An, Taejeon (KR); Hyeong-Jin Kim, Taejeon (KR)

(73) Assignee: LG Chem, Ltd., Seoul (KR)

( * ) Notice: Subject to any disclaimer, the term of this patent is extended or adjusted under 35 U.S.C. 154(b) by 924 days.

(21) Appl. No.: 11/651,463

(22) Filed: Jan. 10, 2007

(65) Prior Publication Data

US 2007/0134557 A1    Jun. 14, 2007

Related U.S. Application Data

(63) Continuation of application No. 10/312,672, filed as application No. PCT/KR02/00971 on May 22, 2002, now Pat. No. 7,217,479.

(30) Foreign Application Priority Data

May 22, 2001    (KR) ............................. 2001-0028063

(51) Int. Cl.
   *H01M 6/16*   (2006.01)
   *C07C 33/34*  (2006.01)
   *C07C 35/00*  (2006.01)
(52) U.S. Cl. ........................... 429/326; 568/715; 568/700
(58) Field of Classification Search .................. 429/326; 568/715, 700
   See application file for complete search history.

(56) References Cited

U.S. PATENT DOCUMENTS 4,781,999 A    11/1988   Vignaud
6,277,525 B1 *  8/2001   Yamamoto et al. ........... 429/326

FOREIGN PATENT DOCUMENTS

EP         0 206 202 A1    12/1986

(Continued)

OTHER PUBLICATIONS

Becker et al., "Electrochemical Oxidation of deca-n-propylcyclopentasilane [(n-Pr)2Si]5, dodecamethylcyclohexasilane (Me2Si)6 and tetradecaethylcycloheptasilen (Et2Si)7", J. Electroanalytical. Chem., 417 (1996) 77-82.

*Primary Examiner* — Karie O'Neill Apicella
(74) *Attorney, Agent, or Firm* — Birch, Stewart, Kolasch & Birch, LLP

(57) ABSTRACT

The present invention relates to a non-aqueous electrolyte additive for improving safety and a lithium secondary battery comprising the same, and more particularly to a non-aqueous electrolyte additive that can improve cycle life and safety properties of a lithium ion secondary battery. According to the present invention, an organometallic compound represented by the Chemical Formula 1 is added to a non-aqueous electrolyte of a battery as an additive, and thus if a battery voltage is out of normal operation voltage range due to a short circuit and overcharge of a battery, etc., the non-aqueous electrolyte additive decomposes and a part of the decomposed additive polymerizes to form an insulating film on a cathode surface, and a part of the metal reacts with an insulating film formed on a cathode surface to improve thermal stability of the battery, thereby improving safety of the battery.

6 Claims, 2 Drawing Sheets

FOREIGN PATENT DOCUMENTS

| | | |
|---|---|---|
| EP | 0 581 296 A2 | 7/1993 |
| EP | 581296 A2 * | 2/1994 |
| JP | 60-184028 A | 9/1985 |
| JP | 2-145563 A | 6/1990 |
| JP | 3-236171 A | 10/1991 |
| JP | 7-302614 A | 11/1995 |
| JP | 11-162508 A | 6/1999 |
| JP | 11-199579 A | 7/1999 |
| JP | 11-219730 | 8/1999 |
| JP | 12-268858 A | 9/2000 |
| JP | 2002-343423 | 11/2002 |

* cited by examiner

NON-AQUEOUS ELECTROLYTE ADDITIVE FOR IMPROVING SAFETY AND LITHIUM ION SECONDARY BATTERY COMPRISING THE SAME

This application is a Continuation of application Ser. No. 10/312,672, filed on Dec. 31, 2002 now U.S. Pat. No. 7,217,479 B2. Application Ser. No. 10/312,672 is the U.S. National Stage of PCT/KR02/00971, filed May 22, 2002. This application also claims priority to KR 2001-0028063, filed May 22, 2001 in Korea. The entire contents of all are hereby incorporated by reference and priority is claimed under 35 U.S.C. §120 and §119.

BACKGROUND OF THE INVENTION (a) Field of the Invention

The present invention relates to a non-aqueous electrolyte additive for improving safety and a lithium ion secondary battery comprising the same, and more particularly to a non-aqueous electrolyte additive that can improve cycle life and safety properties of a lithium ion secondary battery.

(b) Description of the Related Art

In concert with the development of the information electronics industry, studies regarding batteries, which are referred to as the heart of all electronic equipment, are actively in progress. Specifically, a lithium ion secondary battery with a light weight and a high capacity has attracted attention as one of the essential parts of electronic equipment with the miniaturization of high-technology electronics equipment.

The lithium ion secondary battery uses a transition metal complex oxide such as lithium, cobalt, etc. as a cathode active material; a crystallized carbon such as graphite as an anode active material; and an aprotic organic solvent in which lithium salts such as $LiClO_4$, $LiPF_6$, etc. are dissolved as an electrolyte. Such a battery has high performance and a light weight, rendering it suitable as a battery for miniature electronic equipment such as cellular phones, camcorders, notebook computers, etc. However, this battery has many safety problems since it does not use an aqueous electrolyte but instead uses a highly flammable organic solvent as an electrolyte. Safety is the most important aspect of a lithium ion secondary battery using a non-aqueous electrolyte, and specifically, preventing short circuits and overcharging problems are very important factors thereof.

SUMMARY OF THE INVENTION

The present invention is made in consideration of the problems of the prior art, and it is an object of the present invention to provide a non-aqueous electrolyte additive that can achieve superior safety even under dangerous circumstances caused by misoperation or misuse of the battery, including a large current discharge due to an overcharge or a short circuit in a 4V grade lithium and lithium secondary battery charged with a large current and a high energy density.

It is another object of the present invention to provide a lithium ion secondary battery comprising the non-aqueous electrolyte additive.

In order to achieve these objects, the present invention provides a non-aqueous electrolyte additive comprising an organometallic compound represented by the following Chemical Formula 1:

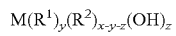  [Chemical Formula 1]

$$M(R^1)_y(R^2)_{x-y-z}(OH)_z$$

wherein $R^1$ and $R^2$, which are coordinated with the central metal atom, are independently or simultaneously an alkyl group, an alkoxy group, a phenyl group or a halogen-substituted phenyl group;

M is an atom selected from the group consisting of Al, B, Si, Ti, Nb, V, Cr, Mn, Fe, CO, Cu, Zn, Ni, Sn, GA, Gd, Zr, and Ta;

x is a valence of a central metal atom;

y is a value satisfying $0<y<x$; and z is a value satisfying $0<z<x$.

The present invention also provides a lithium ion secondary battery comprising:

a) an anode capable of adsorbing and releasing lithium;
b) a cathode capable of adsorbing and releasing lithium; and
c) a non-aqueous electrolyte comprising an organometallic compound represented by the above Chemical Formula 1.

DETAILED DESCRIPTION AND THE PREFERRED EMBODIMENTS

Figure 1:
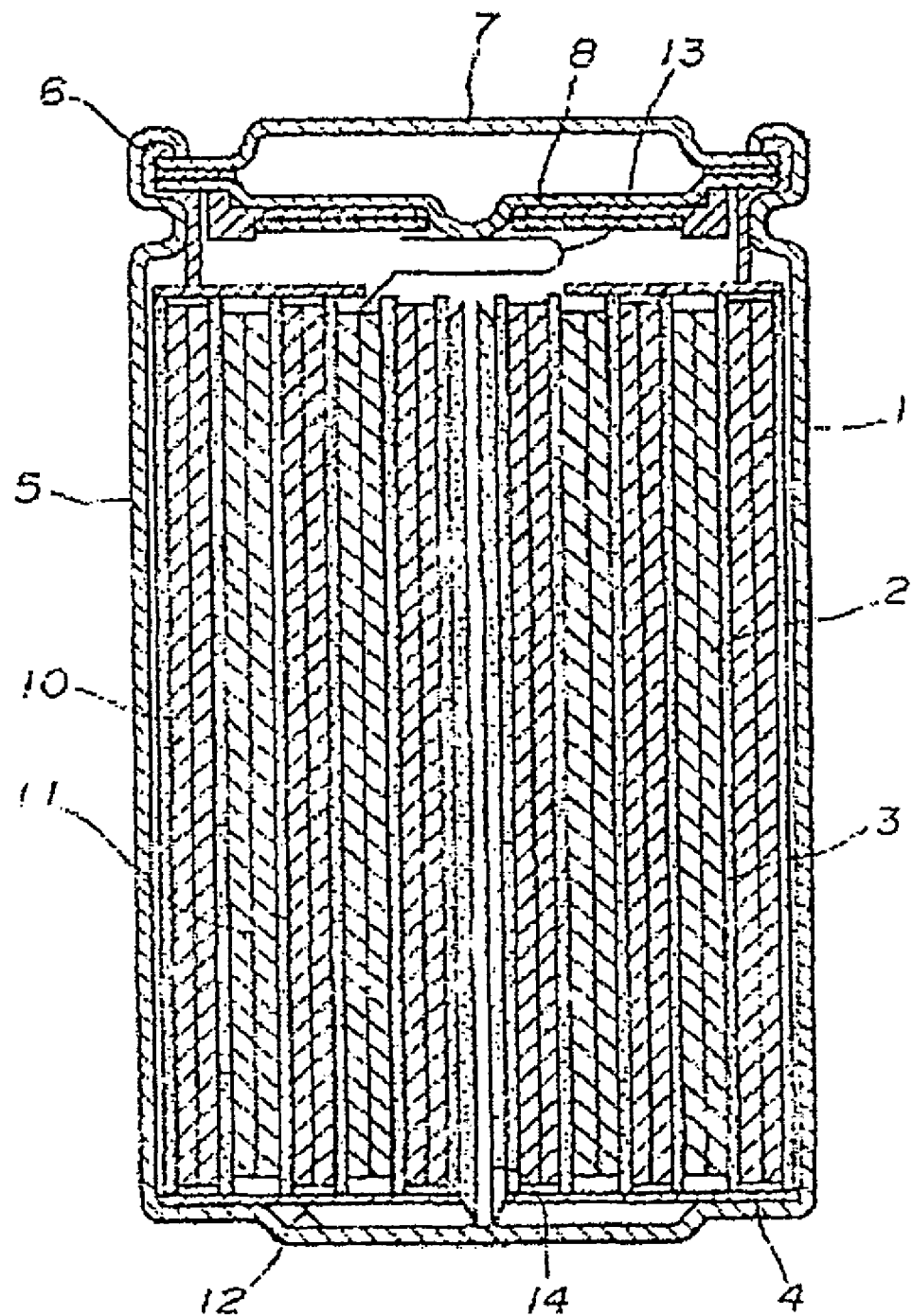
FIG. 1 shows a structure of the lithium ion secondary battery of the present invention.

The present invention will now be explained in detail.

The present invention provides an organometallic compound such as a metal alkoxide represented by the above Chemical Formula 1 wherein some of the alkoxy coordinators around the central atom are substituted by a benzene-based compound, preferably a phenyl group, and hydroxy group, as a non-aqueous additive for a non-aqueous electrolyte in which a lithium salt is dissolved, for improving safety of a lithium ion secondary battery. In addition, the present invention provides a lithium ion secondary battery that uses lithium or carbon capable of adsorbing and releasing lithium as an anode, a specific complex oxide of lithium and a transition metal as a cathode, and an organometallic compound represented by the Chemical Formula 1 as a non-aqueous electrolyte. According to the present invention, a large current discharge due to a short circuit or overcharge caused by battery misoperation or misuse can be prevented by a chemical reaction of additives included in a non-aqueous electrolyte, and thus safety of a battery can be improved.

The organometallic compound represented by the Chemical Formula 1 does not function in a battery operated within the normal voltage range, and a part of the metal alkoxide coordinators absorbs or removes moisture from an electrode or non-aqueous electrolyte, thereby improving the cycle life properties of the battery.

On the other hand, if the voltage abnormally increases by being overcharged, etc., additives of the non-aqueous electrolyte of the lithium ion secondary battery that decompose at the surface of the cathode under a completely charged state produce decomposition by-products (preferably benzene-based compounds) that form radicals that polymerize and thereby form an insulating film on a cathode surface. In addition, a metallic inorganic substance of the residue is activated to improve thermal stability of an insulating film formed on the cathode surface. Moreover, at a large current discharge, coordinators hydrated by hydrolysis with moisture are converted into hydroxy functional groups and react with lithium rushed from the anode to form an insulating film on the cathode surface, thereby giving safety to the battery.

Specifically, in the Chemical Formula 1, when $R^1$ is a phenyl group, y is the number of substituted alkoxy groups coordinated with metal in a metal alkoxide compound. As the value y increases, the amount of the benzene-based compound (preferably a phenyl group) increases and thus polymer insulating film formation becomes predominant. Meanwhile, as the value z increases, during a large current discharge due to a short circuit, a hydrated organometallic compound reacts with lithium rushed from an anode to the cathode due to its high reactivity, to form an insulating film on the cathode surface, thereby improving safety of the battery.

As explained, in the organometallic compound represented by the Chemical Formula 1, if a battery is overcharged by a chemical reaction of additives contained in a non-aqueous electrolyte, a benzene-based compound and an attached metal compound are separated from the metallic compound and polymerized to form an insulating polymer film that blocks current, and a metal reacts with a polymer insulating film formed on a cathode surface to improve thermal stability of an insulating film, thereby further improving safety of the battery.

More specifically, the organometallic compound represented by the Chemical Formula 1 is a metallic compound having a chemically stable benzene compound, hydrolysable alkoxide functional groups, and a hydrolyzed hydroxy group. The compound does not function within a normal operation range, and an alkoxy functional group coordinating metal causes hydrolysis with moisture in an electrode or non-aqueous electrolyte and hydrates to remove moisture from a battery by an alcohol-releasing reaction, thereby removing negative influences of moisture on cycle life properties of the battery. Furthermore, since the compound has a large volume when dissolved in an electrolyte, if a rapid current flows in a large current discharge, the compound decreases the diffusion rate of lithium and contributes to battery safety. If a battery is overcharged to out of the normal operation voltage range, the benzene compound in the organometallic compound react to form a polymer insulating film on a cathode surface and improves thermal stability of a polymer layer to further restrain potential ignition of the battery due to the exothermic reaction of the overcharge.

The organometallic compound represented by the Chemical Formula 1 is preferably represented by the following Chemical Formula 1a, which has a metal atom in the center, and a phenyl group $R^1$, an alkoxy group $R^2$, and a hydroxy group around the metal.

$$M(R^1)_y(OR)_{x-y-z}(OH)_z \qquad \text{[Chemical Formula 1a]}$$

wherein $R^1$ is a phenyl group or a halogen-substituted phenyl group coordinated with a central metal atom;

$R^2$ is an alkyl group, coordinated with a central metal atom;

M is an atom selected from the group consisting of Al, B, Si, Ti, Nb, V, Cr, Mn, Fe, Co, Cu, Zn, Ni, Sn, Ga, Gd, Zr, and Ta;

x is a valence of the central metal atom;

y is a value satisfying 0<y<x; and z is a value satisfying 0<z<x.

An alkoxy group, although reactivity varies according to carbon number, is stable in an organic solvent, and it hydrolyzes with water molecules to release an alcohol. Accordingly, it can remove moisture from a battery to improve cycle life properties of the battery. The reactivity of the compound differs according to its central atom. A metal atom that is hydrated by reaction with water can easily react with activated lithium to form an insulator of a glass configuration. Metal alkoxide comprising the benzene-based compound is decomposed during overcharge to provide a benzene-based compound and an activated metal alkoxide, thereby improving thermal stability of each polymer insulating film. In addition, hydrated metal alkoxide reacts with lithium deposited in an anode during overcharge to remove activity of lithium and form a ceramic insulating film, thereby providing effective methods for achieving battery safety.

According to the present invention, a non-aqueous electrolyte lithium ion secondary battery comprising the compound represented by the Chemical Formula 1 as a non-aqueous electrolyte additive is prepared.

The non-aqueous electrolyte lithium secondary battery of the present invention comprises an anode capable of adsorbing and releasing lithium, a cathode capable of adsorbing and releasing lithium, and a non-aqueous electrolyte comprising a metal alkoxide compound represented by the Chemical Formula 1. The anode and cathode capable of adsorbing and releasing lithium are prepared by a common method, and a non-aqueous electrolyte comprising the metal alkoxide compound is injected therein to prepare a secondary battery.

The active material for the anode capable of adsorbing and releasing lithium is preferably a carbon-based material selected from the group consisting of graphite, carbon fiber, and active carbon. The anode further comprises a binder, preferably polyvinylidene fluoride (PVDF).

As the active material for the cathode, a lithium transition metal complex oxide represented by the following Chemical Formula 2 can be used.

$$Li_xMO_2 \qquad \text{[Chemical Formula 2]}$$

wherein M is Ni, Co, or Mn; and x is a value satisfying $0.05 \leq x \leq 1.10$.

The compound represented by the Chemical Formula 1 used as a non-aqueous electrolyte additive in the present invention is present at 0.01 to 20 wt % of the electrolyte. As the non-aqueous electrolyte additive, an aprotic organic solvent wherein lithium salts such as $LiClO_4$, $LiPF_6$, $LiBF_4$, etc. are dissolved is used.

The preferable Example of fabrication of the non-aqueous electrolyte lithium ion secondary battery of the present invention is as shown in FIG. 1.

As shown in FIG. 1, the lithium secondary battery of the present invention comprises an anode 1 formed of an anode current collector 10 on which anode active material is coated, and a cathode 2 formed of a cathode current collector 11 on which cathode active material is coated. The anode and the cathode are rolled together in a jelly roll configuration with a separator 3 therebetween, an insulator 4 is located at upper and lower sides of the anode and cathode roll, and a can 5 receives it. A battery cover 7, enclosed with a gasket 6, seals the battery can 5. The battery cover 7 is electrically connected to the cathode 2 through a cathode lead 13, and the can 5 is electrically connected to the anode 1 through an anode lead 12. For the battery of the present invention, the cathode lead 13 is welded to a pressure-release valve 8 in which a protuberance selectively seals a pressure-release vent, and thus the cathode lead electrically connects with the battery cover 7 through the pressure-release valve 8. In a battery with this construction, when pressure inside the battery increases, the protuberance of the pressure-release valve 8 is forced from the vent, and inner pressure is released through the vent.

The present invention will be explained in more detail with reference to the following Examples and the Comparative Example. However, these are to illustrate the present invention and the present invention is not limited to them.

Example 1

A non-aqueous electrolyte lithium ion secondary battery was prepared as follows:

Preparation of an Anode

After mixing carbon powder and polyvinylidene fluoride (PVDF) as a binder in a weight ratio of 90:10, the mixture was dispersed in N-methyl-pyrrolidone (NMP) as a solvent to prepare an anode mixture slurry. The anode mixture slurry was uniformly coated on both sides of an anode current collector Cu foil at a thickness of 10 μm and dried, and then was compression molded with a roll press to prepare an anode of a band shape.

Preparation of a Cathode

Lithium carbonate and cobalt carbonate were mixed in a mole ratio of 1:1 and calcined at 900° C. for 7 hours to obtain $LiCoO_2$. 92 wt % of the lithium cobalt complex oxide, 4 wt % of carbon as a conductor, and 4 wt % of PVDF as a binder were added to a solvent NMP to prepare a cathode mixture slurry. The cathode mixture slurry was coated on a cathode current collector Al thin film at a thickness of 20 μm and dried, and then was compression molded with a roll press to prepare a cathode of a band shape.

Porous polyethylene film was used as a separator, and the band-shaped anode and the band-shaped cathode were laminated and rolled together in a jelly roll configuration. The length and width of the anode and cathode roll were controlled so as to be appropriately received into a battery can with an outer diameter of 18 mm and a height of 65 mm. The anode and cathode roll was deposited in the battery can with insulating plates disposed above and below it. Then, an anode lead formed of nickel was attached to the anode current collector and welded to the battery can, and a cathode lead formed of aluminum that was connected to the cathode current collector was welded to an aluminum pressure-relief valve mounted at the battery cover.

The non-aqueous electrolyte of the present invention was then injected into the fabricated battery. A solvent for the non-aqueous electrolyte was a mixed solvent of EC and EMC at a ratio of 1:2. $LiPF_6$ was used as an electrolyte, and diphenyl disilanediol was added at 2 wt % of the electrolyte to prepare a non-aqueous electrolyte.

The fabricated battery was charged to 4.2 V with a constant current of 0.4 mA/cm². Standard capacity of a non-aqueous electrolyte secondary battery is 100 mAh and charge/discharge cycles were performed at a rate of 1 C (1000 mA/h) with a constant current of from 4.2 V to 3 V.

Examples 2 to 9

A non-aqueous electrolyte secondary battery was fabricated by the same method as in Example 1, except that compounds shown in Table 1 were used as additives instead of diphenyl disilanediol.

Comparative Example

A secondary battery was fabricated by the same method as in Example 1, except that no additive was added to the non-aqueous electrolyte.

Experiment 1

The batteries fabricated in Examples 1 to 9 and the Comparative Example were charged and pins were passed through them to perform pin tests, and the results are as shown in Table 1.

TABLE 1

| | Additive | Whether or not exploded as a result of pin test |
|---|---|---|
| Example 1 | Phenyl boronic acid | No explosion |
| Example 2 | Triphenyl tin hydroxide | No explosion |
| Example 3 | Diphenyl tin hydroxide | No explosion |
| Example 4 | Phenyl boronic diol | No explosion |
| Example 5 | Phenyl 2-methoxy silanol | No explosion |
| Example 6 | 2-phenyl methoxy silanol | No explosion |
| Example 7 | 2-phenyl silanediol | No explosion |
| Example 8 | 2-pehnyl 2-ethoxy silanol | No explosion |
| Example 9 | Triphenyl silanol | No explosion |
| Comparative Example | None | Explosion |

As shown in Table 1, the batteries of Examples 1 to 9 comprising non-aqueous electrolytes to which additives were added did not ignite or explode after having pins passed through them and being short circuited, even after charging. This is because in the additive-added non-aqueous electrolyte, at a large current discharge due to a short circuit, a speed of lithium rushed from an anode is controlled or lithium rushed from an anode reacts with lithium rushed from a cathode surface to form an insulating film on the surface.

Experiment 2

The cycle life properties and maximum temperature after blocking current by overcharge of the batteries fabricated in Examples 1 to 9 and the Comparative Example are shown in Table 2.

TABLE 2

| | Cycle life property (%) Capacity fraction (capacity after 100 cycles/initial capacity) | Overcharge Test Maximum temperature of battery after blocking current (° C.) |
|---|---|---|
| Example 1 | 85 | 102 |
| Example 2 | 94 | 114 |
| Example 3 | 92 | 112 |
| Example 4 | 87 | 105 |
| Example 5 | 96 | 116 |
| Example 6 | 95 | 114 |
| Example 7 | 96 | 112 |
| Example 8 | 97 | 113 |
| Example 9 | 94 | 112 |
| Comparative Example | 95 | Thermal influx |

As can be seen from Table 2, adding a compound represented by the Chemical Formula 1 as an additive, although slight variations occur according to the kinds of compounds, generally improves cycle life properties. Regarding maximum temperature after blocking current by overcharge, the battery of the Comparative Example comprising an electrolyte without an additive exploded by thermal influx, but those of Examples 1 to 9 with additives were prevented from ignition by thermal influx. It is considered that, at overcharge, the additive forms a polymer insulating film on the cathode surface to block the overcharge current or reduce the activity of lithium that causes battery ignition.

Figure 2:
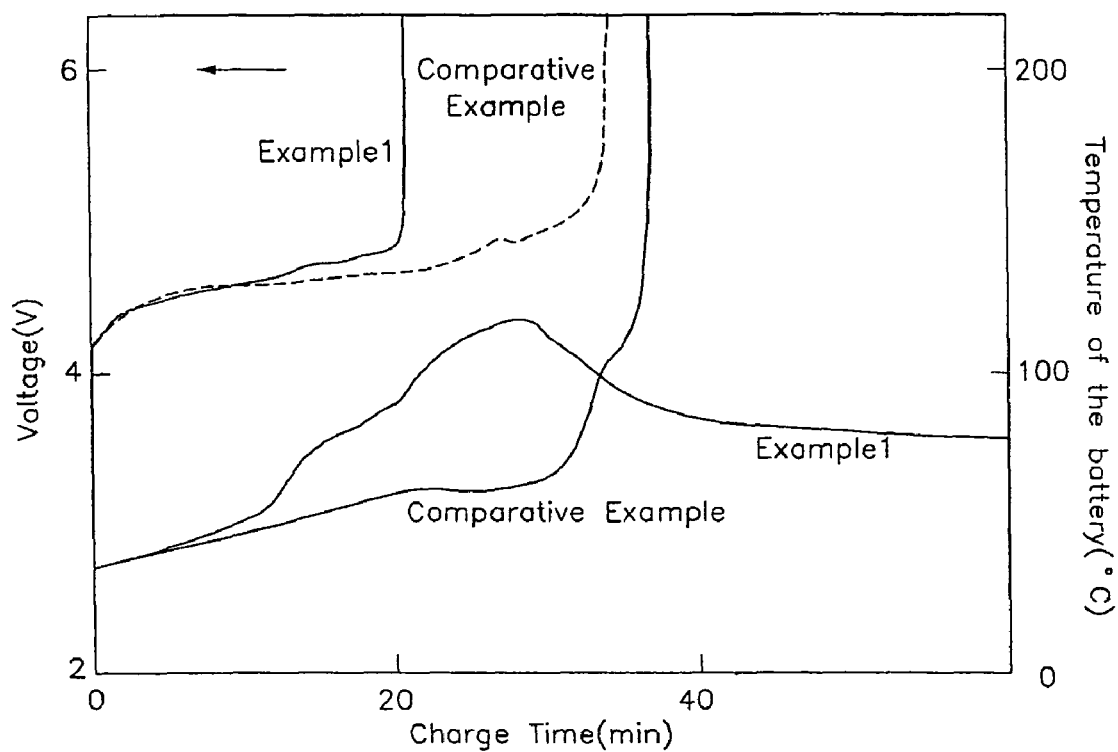
FIG. 2 shows changes in temperature and voltage of the batteries of Example 1 of the present invention and the Comparative Example, according to overcharge time.

FIG. 2 shows change in temperature and voltage of batteries of Example 1 and Comparative Example according to overcharge time. As shown in FIG. 2, the battery of Example 1 did not exhibit heat congestion contrary to that of the Comparative Example without an additive, and its temperature decreased after a specific time elapsed.

As explained, according to the present invention, a metal alkoxide compound represented by the Chemical Formula 1 is added to a non-aqueous electrolyte of a battery as an additive, and thus, if a battery voltage is out of normal operation voltage range due to a short circuit and overcharge of the battery, an additive decomposes and a part of the decomposed additive forms an insulating film on a cathode surface, and metal reacts with the insulating film formed on the cathode surface to improve thermal stability of the battery, thereby improving safety of the battery.

What is claimed is:

1. A non-aqueous electrolyte lithium ion secondary battery comprising:
   a) an anode capable of adsorbing and releasing lithium;
   b) a cathode capable of adsorbing and releasing lithium; and
   c) a non-aqueous electrolyte solution comprising a lithium salt, an aprotic solvent, and an organometallic compound represented by the following Chemical Formula 1a:

$$Si(R^1)_y(OR)_{x-y-z}(OH)_z \qquad \text{[Chemical Formula 1a]}$$

wherein $R^1$ is a phenyl group or a halogen-substituted phenyl group coordinated with a central metal atom;
   R is an alkyl group coordinated with a central metal atom;
   x is a valence of a central metal atom;
   y is a value satisfying $0<y<x$; and
   z is a value satisfying $0<z<x$.

2. The lithium ion secondary battery according to claim 1, wherein the a) anode comprises carbon material selected from a group consisting of graphite, carbon fiber, and active carbon as active material.

3. The lithium ion secondary battery according to claim 1, wherein the b) cathode comprises a lithium transition metal complex oxide represented by the following Chemical Formula 2 as active material:

$$Li_xMO_2 \qquad \text{[Chemical Formula 2]}$$

wherein M is Ni, Co, or Mn; and x is a value satisfying $0.05 \leq x \leq 1.10$.

4. The lithium ion secondary battery according to claim 1, wherein the c) organometallic compound is contained in an amount of 0.01 to 20 wt % of electrolyte.

5. The lithium ion secondary battery according to claim 1, wherein the c) organometallic compound is phenylalkoxysilanol.

6. The lithium ion secondary battery according to claim 1, wherein the R in the c) organometallic compound is methyl or ethyl.

* * * * *